United States Patent [19]

Saito et al.

[11] Patent Number: 5,463,756
[45] Date of Patent: Oct. 31, 1995

[54] MEMORY CONTROL UNIT AND ASSOCIATED METHOD FOR CHANGING THE NUMBER OF WAIT STATES USING BOTH FIXED AND VARIABLE DELAY TIMES BASED UPON MEMORY CHARACTERISTICS

[75] Inventors: Yoshihiro Saito; Yoshiaki Kittaka, both of Itami, Japan

[73] Assignee: Mitsubishi Denki Kabushiki Kaisha, Tokyo, Japan

[21] Appl. No.: 102,119

[22] Filed: Aug. 4, 1993

Related U.S. Application Data

[63] Continuation of Ser. No. 608,146, Nov. 1, 1990, abandoned.

[30] Foreign Application Priority Data

Nov. 6, 1989 [JP] Japan ..................................... 1-289026

[51] Int. Cl.[6] .............................. G06F 12/00; G06F 1/12
[52] U.S. Cl. ..................... 395/494; 395/550; 364/DIG. 1
[58] Field of Search .................................. 395/425, 550, 395/325; 365/189.05, 233, 233.5

[56] References Cited

U.S. PATENT DOCUMENTS

| | | | |
|---|---|---|---|
| 3,753,232 | 8/1973 | Sporer | 395/425 |
| 3,974,479 | 8/1976 | Kotok et al. | 395/425 |
| 4,065,862 | 1/1978 | Meyer | 395/550 |
| 4,366,540 | 12/1982 | Berglund et al. | 395/550 |
| 4,509,120 | 4/1985 | Daudelin | 395/550 |
| 4,631,659 | 12/1986 | Hayn, II et al. | 395/425 |
| 4,819,158 | 4/1989 | Miyashita | 395/325 |
| 4,870,562 | 9/1989 | Kimoto et al. | 395/550 |
| 4,888,685 | 12/1989 | Morinaga et al. | 395/275 |
| 4,956,804 | 9/1990 | Matsumoto | 395/425 |
| 4,961,172 | 10/1990 | Shubat et al. | 365/233.5 |
| 5,151,986 | 9/1992 | Langan et al. | 395/550 |
| 5,155,812 | 10/1992 | Ehlig et al. | 395/425 |
| 5,237,674 | 8/1993 | Mohme et al. | 395/425 |

Primary Examiner—Glenn Gossage
Attorney, Agent, or Firm—Townsend and Townsend and Crew

[57] ABSTRACT

A memory control unit and associated method for changing memory access time are used in a microprocessor system in order to make it possible to alter the number of wait states in accordance with memory characteristics. The memory control unit incorporates a register which holds at least 1 bit of data related to the wait states, outputs a response signal to a central processing unit (CPU) at a timing changed in accordance with the data held in the register, and changes the data held in the register by executing a write cycle under control of the CPU. The memory control unit includes a section for holding fixed data representing a fixed delay time based upon an anticipated access time of a memory unit, in addition to the register which holds variable data representing a variable delay time, and an output circuit which adds the fixed data and variable data to produce data representing a total delay time.

14 Claims, 15 Drawing Sheets

MEMORY CONTROL UNIT AND ASSOCIATED METHOD FOR CHANGING THE NUMBER OF WAIT STATES USING BOTH FIXED AND VARIABLE DELAY TIMES BASED UPON MEMORY CHARACTERISTICS

This is a Continuation of application Ser. No. 07/608,146, filed Nov. 1, 1990, now abandoned.

BACKGROUND OF THE INVENTION

1. Field of the Invention

This invention relates to a memory control unit which controls memory access, and particularly to a memory control unit which is incorporated in a microprocessor system development support apparatus and is capable of changing the number of wait states and thus memory access time in accordance with memory performance.

2. Description of Related Art

A microprocessor system development support apparatus comprises components such as a central processing unit (CPU), a memory, a memory control unit and an input/output (I/O) interface; each component interconnected through a system bus. A microprocessor system development support apparatus carries out data input/output with the outside by controlling input and output devices via the I/O interface.

FIG. 1 shows a block diagram illustrating a microprocessor system development support apparatus using a conventional memory control unit. In the drawing, reference numeral 1 represents a CPU operating at a rate of an input clock CLK. CPU 1 accesses external input and output devices via two read only memories (ROMs) 4a, 4b, and a random access memory (RAM) 5 which are arranged on a circuit board and an I/O interface not shown in the drawing, by means of an address bus ADB and a data bus DTB. The CPU 1 outputs address signals to the address bus ADB and carries out input and output of data via the data bus DTB. The CPU 1 also outputs an address enable signal $\overline{AS}$ which indicates that an effective address signal AD is outputted over the address bus ADB, and a data enable signal $\overline{DS}$ which indicates that data DA on the data bus DTB is effective, to a chip selector 2 which selects the ROM 4a, 4b, or RAM 5. The CPU 1 further outputs a read/write signal RD/$\overline{WR}$ which indicates whether the operation is reading or writing, to one input of an OR gate 8 and to one input of an OR gate 7 through an inverter 6. Other inputs of OR gates 7 and 8 receive the data enable signal $\overline{DS}$ from the CPU 1. The output from the OR gate 7 is fed to terminals $\overline{OE}$ of the ROM 4a and ROM 4b, and the output from the OR gate 8 is fed to a terminal $\overline{WR}$ of RAM 5. The chip selector 2 is also provided with the address signal AD from the address bus ADB, and thereby determines which memory to access, ROM 4a, 4b, or RAM 5, and accordingly asserts one of three chip selection signals $\overline{ROM4a\text{-}SEL}$, $\overline{ROM4b\text{-}SEL}$ and $\overline{RAM5\text{-}SEL}$ which are output to the selector terminals CS of ROM 4a, 4b, and RAM 5, respectively and to a memory control unit 3 to be described later.

FIG. 2 shows a block diagram illustrating the primary elements of the conventional memory control unit 3. The memory control unit 3 has three shift registers 10a, 10b, 10c and inverters 11a, 11b, 11c corresponding to the memory units 4a, 4b, 5, respectively, as well as an inverter 13. A bus clock signal BCLK supplied by a clock generator (not shown in the drawing of the memory control unit 3) is outputted to the shift registers 10a, 10b, 10c. The shift registers 10a, 10b, 10c receive the chip selection signals $\overline{ROM4a\text{-}SEL}$, $\overline{ROM4b\text{-}SEL}$ and $\overline{RAM5\text{-}SEL}$ which select memory units 4a, 4b, 5 via the inverters 11a, 11b, 11c, respectively. The shift registers 10a, 10b, 10c, are 8-bit registers giving output signals which have been shifted at every bus cycle, from the output terminals D1, D2, ... D8. Now assuming that reading of the ROM 4a requires a wait time of 2 bus cycles, reading of the ROM 4b requires 3 bus cycles, and reading and writing of the RAM 5 require 1 bus cycle, the output terminal D3 of the shift register 10a, D4 of the shift register 10b and D2 of the shift register 10c are selected (as described in more detail below) by jumper wires 12a, 12b, 12c, respectively, with the outputs being outputted to the CPU 1 via the inverter 13 as a response signal $\overline{DC}$. Thus, the response signal $\overline{DC}$ which is delayed in accordance with the access characteristics of the memory units 4a, 4b, and 5 can be obtained.

Now the wait time required for reading and writing data will be explained. When designing a system utilizing a microprocessor, particularly a microprocessor system development support apparatus, it is necessary to examine whether the access timing of the memory being used complies with the timing of the signals in CPU 1. Because input and output of signals are carried out regularly in the CPU 1 in accordance with the reference clock signal (bus clock), reading and writing of data from and into the memory must be done within this specified interval. If reading and writing of data cannot be done within this period, a wait state during which no operation is performed for a predetermined period of time must be inserted.

FIG. 3 shows a timing chart explaining the address access time and data access time during data reading operation. To read data, the address access time tsu (DA-AD) from the output of address signal AD to the output of data signal DA must satisfy the condition denoted by the following equation (1), and the data access time tsu (DA-$\overline{RS}$) from the output of signal $\overline{RS}$ to the output of data signal DA must satisfy the condition denoted by equation (2), as follows:

$$t_{su}\ (DA\text{-}AD) < (3+n)t_c - t_{su}1 - t_{su}2 \tag{1}$$

$$t_{su}\ (DA\text{-}RS) < (2+n)t_c - t_{su}2 - t_{su}3 \tag{2}$$

where tc: bus cycle,
n: wait number (wait time/tc),
$t_{su}1$: time from output of address signal AD to its assertion,
$t_{su}2$: time from output of signal RS to its assertion,
tsu3: time from output of data signal DA to its assertion.

Consequently, as shown in FIG. 3, wait states need not be inserted when the address access time tsu (DA-AD) and the data access time tsu (DA-$\overline{RS}$) for the memory are less than the value of the right sides of the equations (1) and (2) under the condition of n=0, respectively, although wait state(s) of wait number n must be inserted when the values of tsu are greater than these values.

FIG. 4 shows a timing chart explaining the data set-up time, address set-up time and the pulse duration of the write signal during a writing operation. When writing data, data set-up time td (DA-$\overline{WS}$), from data output to negation of signal $\overline{WS}$ must satisfy the condition represented by equation (3); address set-up time ta (AD-CONT) from the output of the address to the assertion of the address must satisfy the condition represented by equation (4), and the pulse width tw (CONT) of the signal $\overline{WS}$ must satisfy the condition represented by equation (5), as follows:

$$t_d \text{ (DA-}\overline{\text{WS}}\text{)} < (2+n)t_c \quad (3)$$

$$t_a \text{ (AD-CONT)} < t_c - t_{su}4 \quad (4)$$

$$t_w \text{ (CONT)} < (2+n)t_c - t_{su}4 \quad (5)$$

where $t_{su}4$: period from writing of data to stabilization thereof.

Because the periods of time $t_{su}$ (DA-AD), $t_{su}$ (DA-$\overline{\text{RS}}$), $t_d$ (DA-$\overline{\text{WS}}$), $t_a$ (AD-CONT) and $t_w$ (CONT) on the left-hand side of equations (1) through (5) are determined by the access characteristics of the selected memory, wait number n must be determined so that the conditions represented by equations (1) through (5) are satisfied.

For this reason, output terminals D1, D2, . . . D8 of the shift registers 10a, 10b, 10c are selected by means of jumper wires 12a, 12b, 12c in accordance with the access characteristics, such as an anticipated access delay time, of memory units 4a, 4b, 5 in the memory control unit 3 to determine the wait number n in advance.

Now a data access operation of a microprocessor system development support apparatus using the conventional memory control unit 3 will be explained. FIG. 5 shows a flow chart explaining the data access operation. When address signal AD is outputted to the address bus ADB (step #1), the chip selector 2 reads the address signal AD, checks to see which memory unit is selected (step #2), and outputs the chip selection signal to the selected memory unit. The memory control unit 3 checks to see which memory unit is selected based on the chip selection signal. The memory control unit 3 determines (i.e., "sets") the wait number for use with the CPU 1 from the time taken by the selected memory unit to output the data in the case of a data read operation, and to write data in the case of a data write operation, to change the timing of outputting a response signal $\overline{\text{DC}}$ to the CPU 1 (step #3). Upon output of the response signal $\overline{\text{DC}}$, the CPU 1 reads data from the data bus DTB or writes the data into the memory and accesses the memory (step #4), thereby ending the operation.

Now an operation of reading data from the memory will be explained with reference to the reading timing chart shown in FIG. 6. Clock C1 is an internal clock corresponding to the input clock CLK when the bus clock BCLK in the CPU 1 is in the state of "H" and clock C2 is an internal clock corresponding to the input clock CLK when the bus clock BCLK is in the state of "L". The CPU 1 operates these as internal clocks. RD/$\overline{\text{WR}}$ is a read/write signal which indicates the read/write state of the transmitted data, the "H" state thereof indicating data read operation. STATE represents the bus state of the CPU 1.

At the rise of clock C1 at state S1, address signal AD is outputted to the address bus ADB. The read/write signal RD/$\overline{\text{WR}}$ at this point is in the state of "H", indicating the read cycle. At the fall of the clock C1, address enable signal $\overline{\text{AS}}$ is asserted, indicating that an effective address signal AD is outputted to the address bus ADB and, at the same time, the chip selector 2 outputs a chip selection signal to the selected memory unit. The memory control unit 3 asserts the response signal $\overline{\text{DC}}$ at the rise of clock C1 at state S2, and the memory outputs data to the data bus DTB. In the CPU 1, the response signal $\overline{\text{DC}}$ is recognized at the fall of clock C2 at state S2, and data is taken into an input latch (not shown in the drawing) at the fall of clock C2 at state S2 to complete the read cycle. When the response signal $\overline{\text{DC}}$ is not asserted, the CPU 1 enters a wait state, and a wait state Sw of 1 bus cycle is inserted.

Now the reading operation from each memory unit will be explained.

An operation in which the RAM 5 is selected will be explained first.

Address signal AD is outputted to the address bus ADB at the rise of clock C1 at state S1. The chip selector 2 asserts the chip selection signal $\overline{\text{RAM5-SEL}}$ at the fall of clock C1 at state S1. The memory control unit 3 sets the wait number to 1 by means of the shift register 10c, which receives the input of the chip selection signal $\overline{\text{RAM5-SEL}}$, and counts a wait cycle of 1 bus cycle. New signals are never generated in wait state Sw. The memory control unit 3 asserts the response signal $\overline{\text{DC}}$ at the rise of clock C1 at state S2. When the response signal $\overline{\text{DC}}$ is asserted, the RAM 5 decodes the address signal AD and the chip selection signal $\overline{\text{RAM5-SEL}}$ to recognize that it is selected and outputs data signal DA to the data bus DTB. When the response signal $\overline{\text{DC}}$ is asserted, the CPU 1 takes the data signal DA into the input latch at the rise of clock C2 at state S2.

Now an operation in which ROM 4a is selected will be explained. When the chip selector 2 selects the ROM 4a by means of the address signal AD, the memory control unit 3 sets the wait number to 2 by means of the shift register 10a, which received the chip selection signal $\overline{\text{ROM4a-SEL}}$, and counts a wait cycle of 2 bus cycles. The CPU 1 then receives the data in the input latch at the fall of clock C2 at state S2.

When the RAM 5 is selected, the memory control unit 3 sets the wait number to 1 and counts a wait cycle of 1 bus cycle. The CPU 1 then takes in the data at the fall of clock C2 at state S2.

Now an operation of writing data into the RAM 5 will be explained in detail.

FIG. 7 is a timing chart of a writing operation. Data is outputted to the address bus ADB at the rise of clock C1 at state S1. The read/write signal RD/$\overline{\text{WR}}$ enters "L" state, indicating a write cycle. When the address enable signal $\overline{\text{AS}}$ is asserted and an effective address signal AD is on the address bus ADB at the fall of clock C1, the chip selector 2 recognizes that the RAM 5 is selected by means of the address signal AD and outputs a chip selection signal $\overline{\text{RAM5-SEL}}$. The RAM 5 decodes the chip selection signal $\overline{\text{RAM5-SEL}}$ and the address signal AD and recognizes that it is not selected. The CPU 1, on the other hand, outputs data to the data bus DTB during state S1. At the fall of clock C2 at state S1, the data enable signal $\overline{\text{DS}}$ is asserted, indicating that the data bus DTB has settled. The RAM 5 takes in the data on the data bus DTB by logically ORing the read/write signal RD/$\overline{\text{WR}}$ and the data enable signal $\overline{\text{DS}}$. Wait number 1 is inserted by means of the chip selection signal $\overline{\text{RAM5-SEL}}$, which has been outputted to the shift register 10c of the memory control unit 3. The RAM 5 then stores the data and the response signal $\overline{\text{DC}}$ is outputted to the CPU 1. The response signal $\overline{\text{DC}}$ is checked at the fall of clock C2 at state S2 and, when the response signal $\overline{\text{DC}}$ is asserted, the data enable signal $\overline{\text{DS}}$ is negated to complete the write cycle. Now the CPU 1 enters a wait state until the response signal $\overline{\text{DC}}$ is asserted, and a wait state Sw of 1 bus cycle is inserted so that no new signals are generated.

Microprocessor system development support apparatuses are often operated by changing memory, particularly ROM. When a conventional memory control unit is used, a memory change requires a modification of the hardware, such as changing the jumper wires, because the wait number is fixed, resulting in a different operating speed and making it difficult to accommodate various memory devices of different wait numbers or states.

SUMMARY OF THE INVENTION

The present invention solves the problems described above. The primary object of the invention is to provide a memory control unit which is capable of changing a wait number without changing the hardware by incorporating registers in the memory control unit with the wait number stored therein in a write cycle, and setting different timings of response in accordance with the stored values.

According to the memory control unit of the present invention, which is provided with a data holding means for holding at least 1 bit of data, when access to a memory device of different response timing is directed, the CPU changes the data stored in the data holding means in accordance with the response timing of the memory, and a response signal is outputted in accordance with the stored data which has been changed.

The above and further objects and features of the invention will be more fully apparent from the following detailed description with accompanying drawings.

DESCRIPTION OF THE PREFERRED EMBODIMENT

The invention will now be explained in detail with reference to the drawings illustrative of preferred embodiments thereof.

Figure 1:
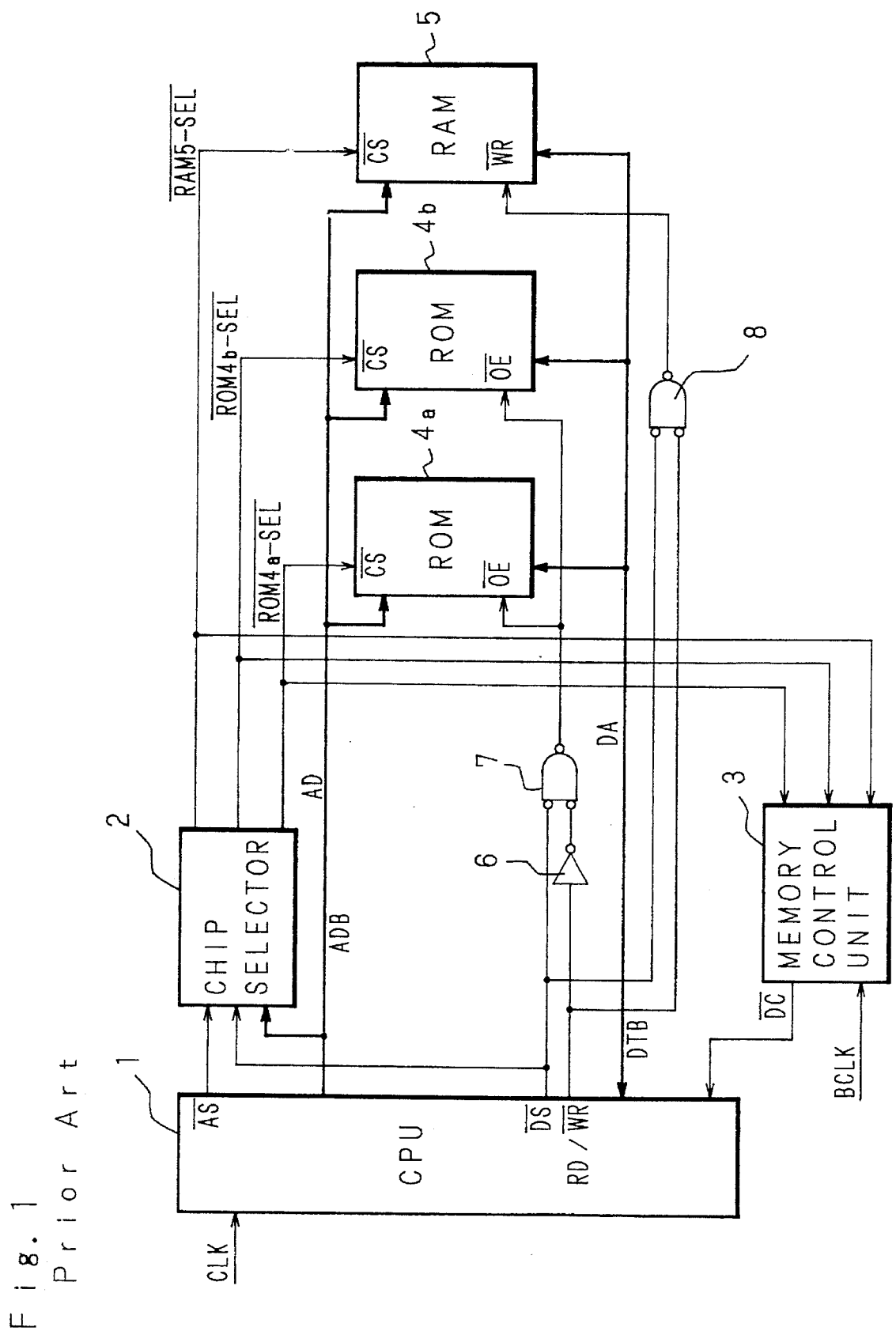
FIG. 1 is a block diagram illustrating a microprocessor system development support apparatus using a conventional memory control unit.
Figure 2:
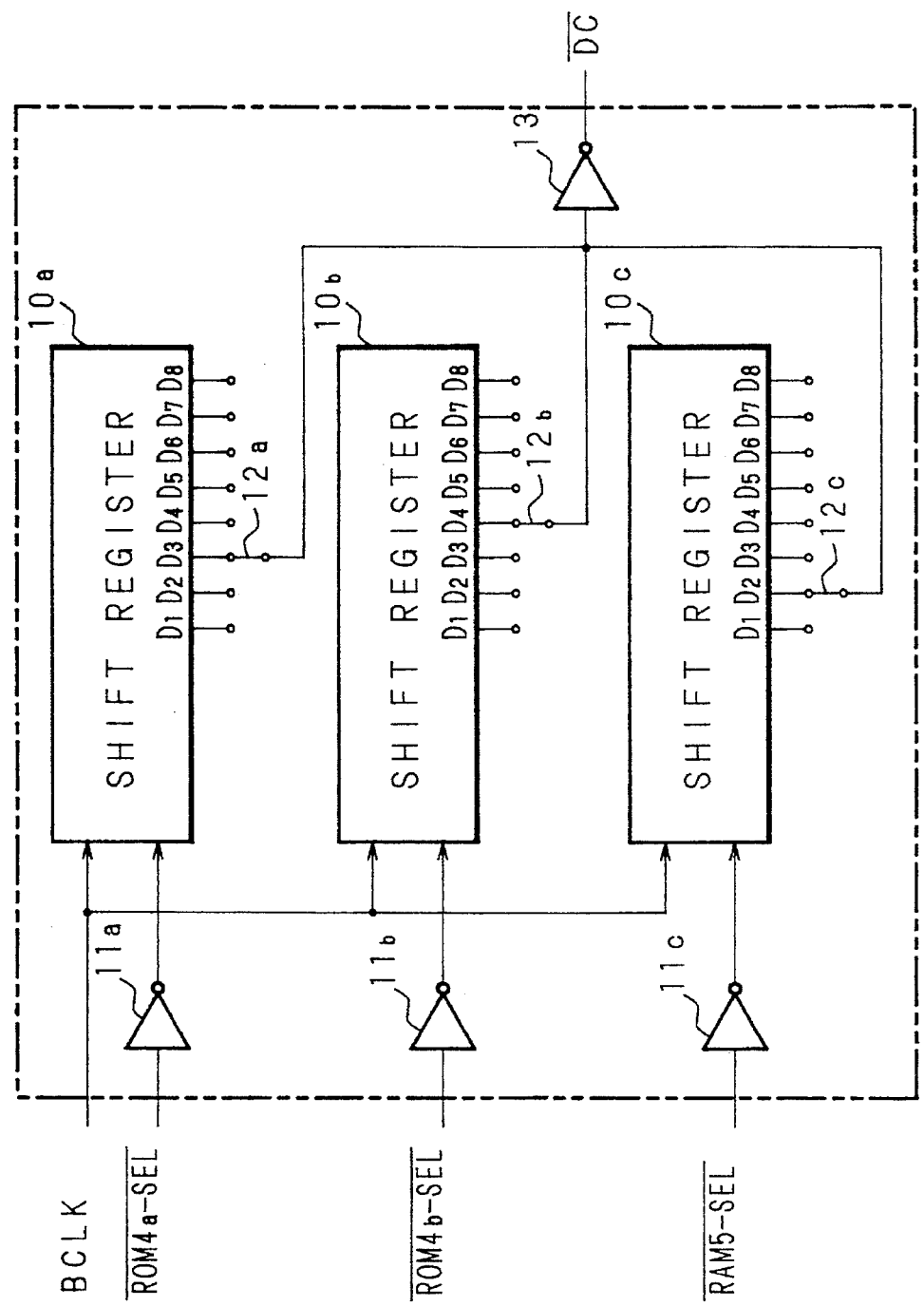
FIG. 2 is a block diagram illustrating a conventional memory control unit.
Figure 3:
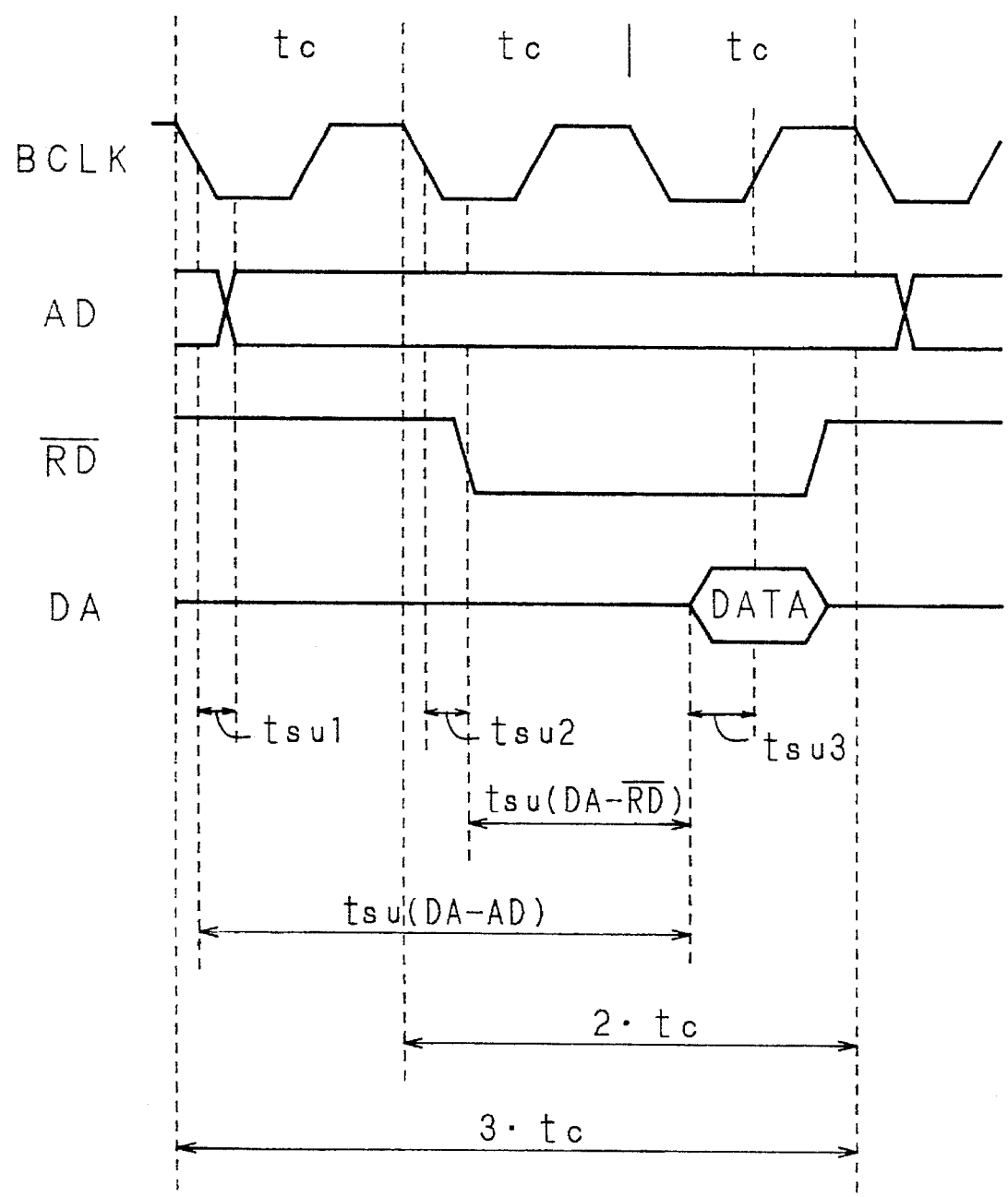
FIG. 3 is a timing chart explaining address access time and data access time during data reading operation.
Figure 4:
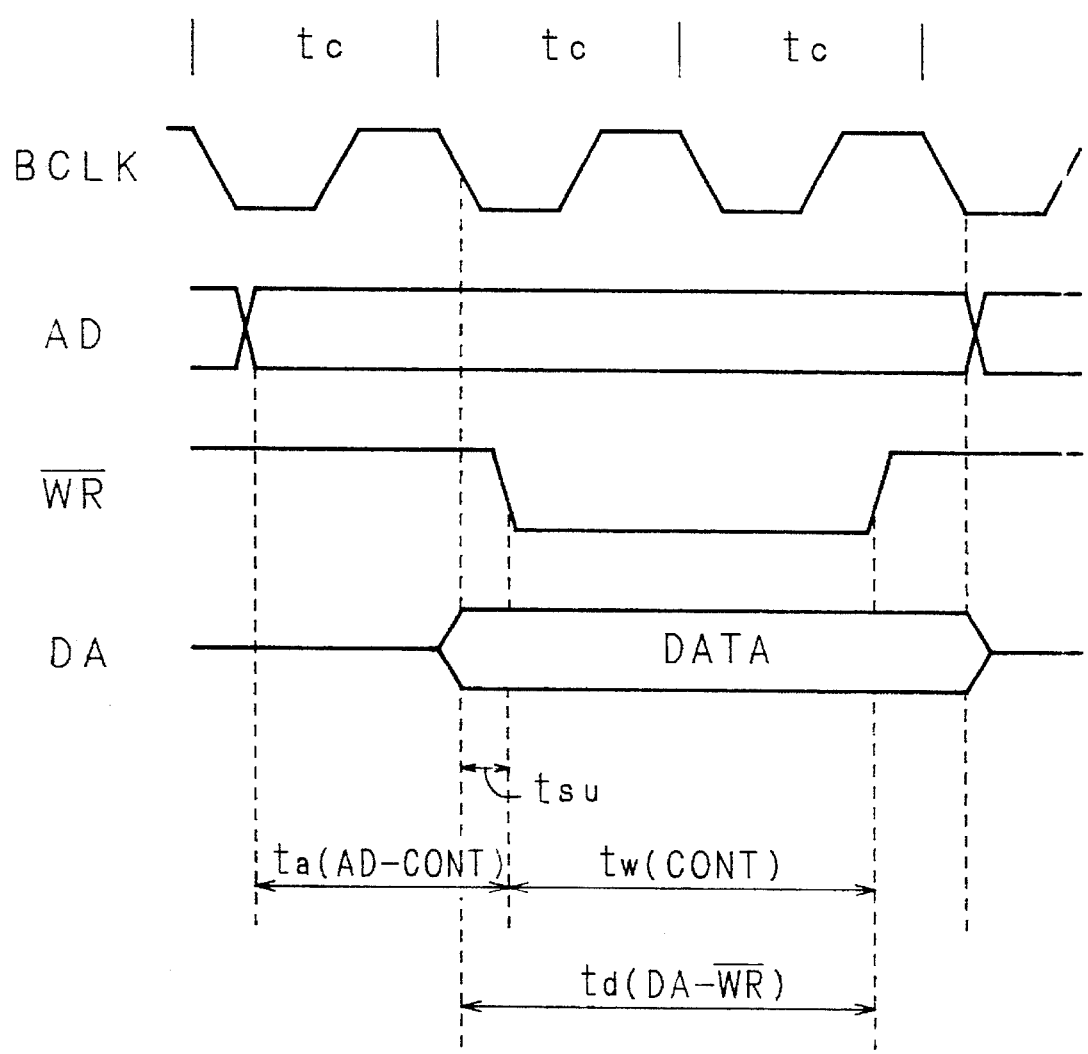
FIG. 4 is a timing chart explaining data set-up time, address set-up time and the pulse duration of a write signal during a writing operation.
Figure 5:
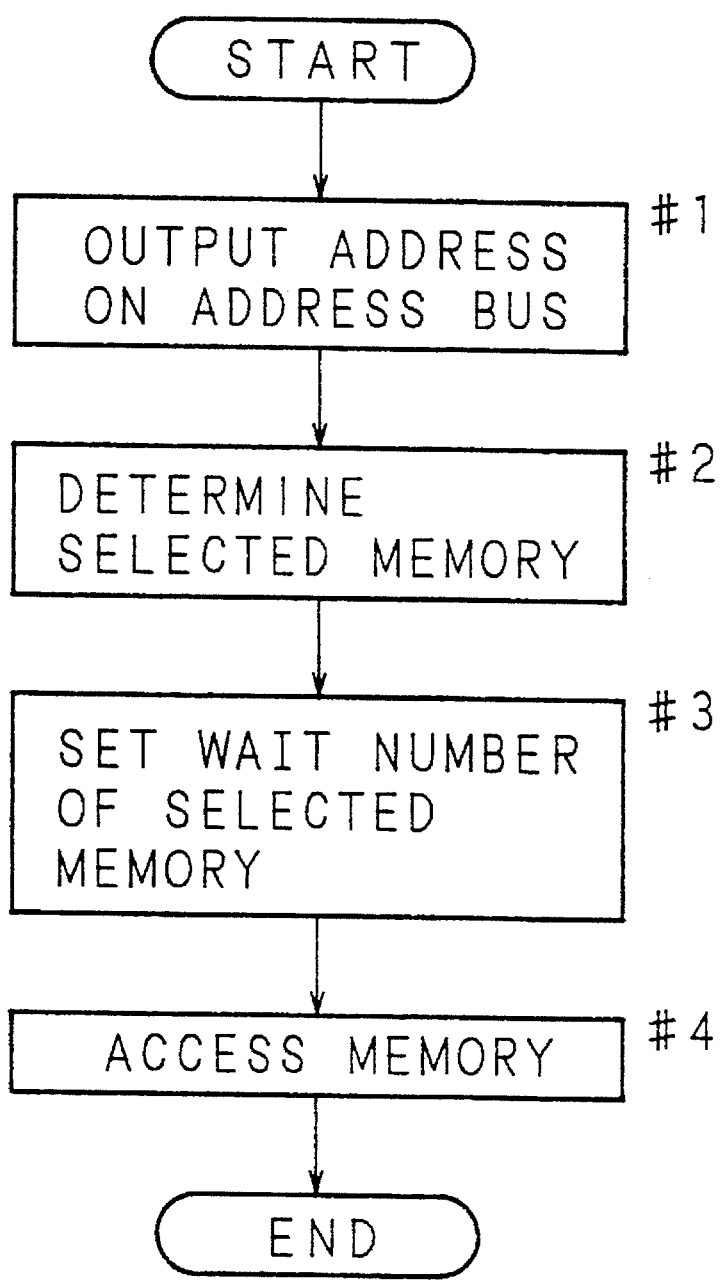
FIG. 5 is a flow chart illustrating the memory access operation of a conventional microprocessor system development support apparatus.
Figure 6:
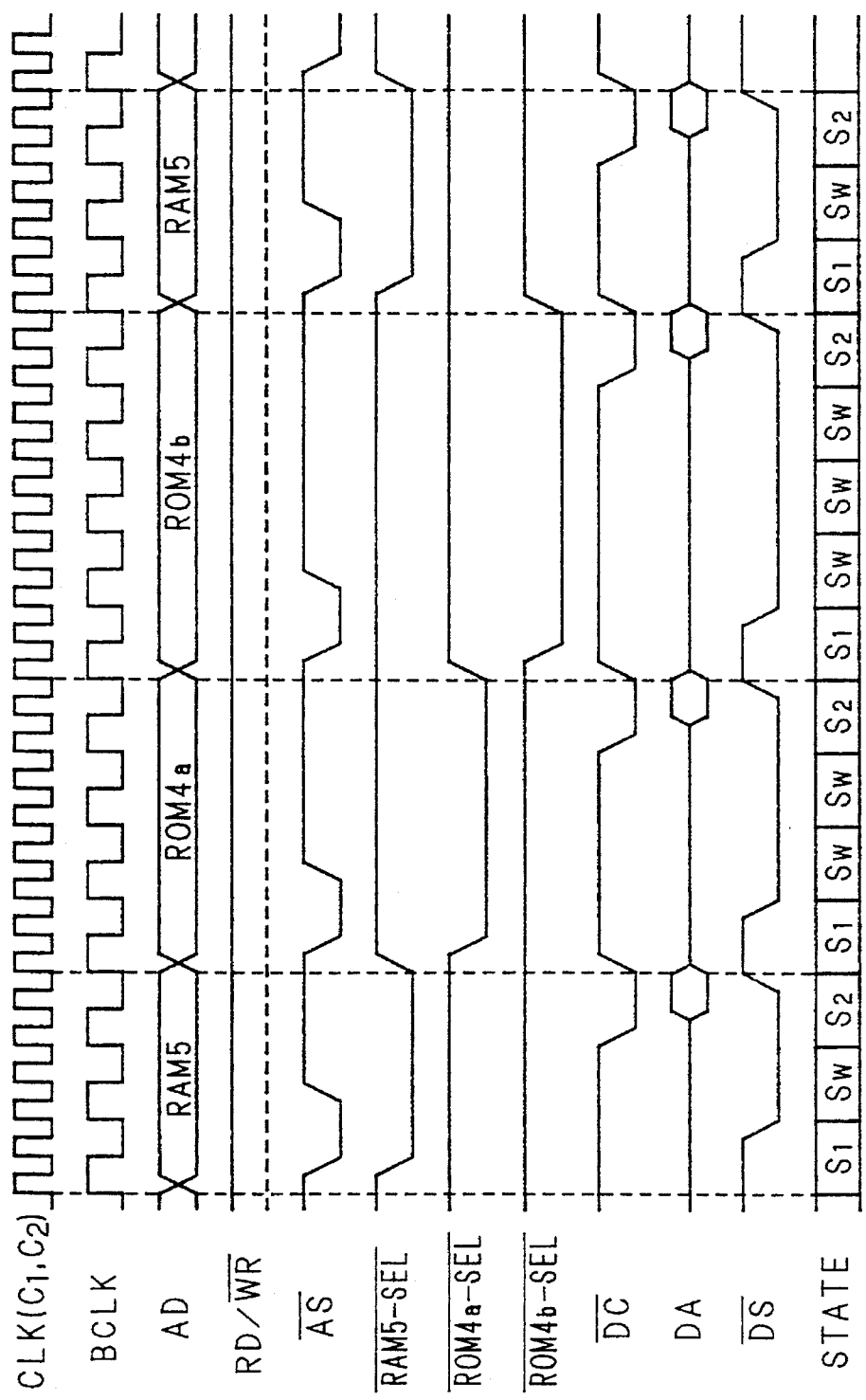
FIGS. 6 and 7 are timing charts illustrating the memory access operation of a conventional microprocessor system development support apparatus.
Figure 7:
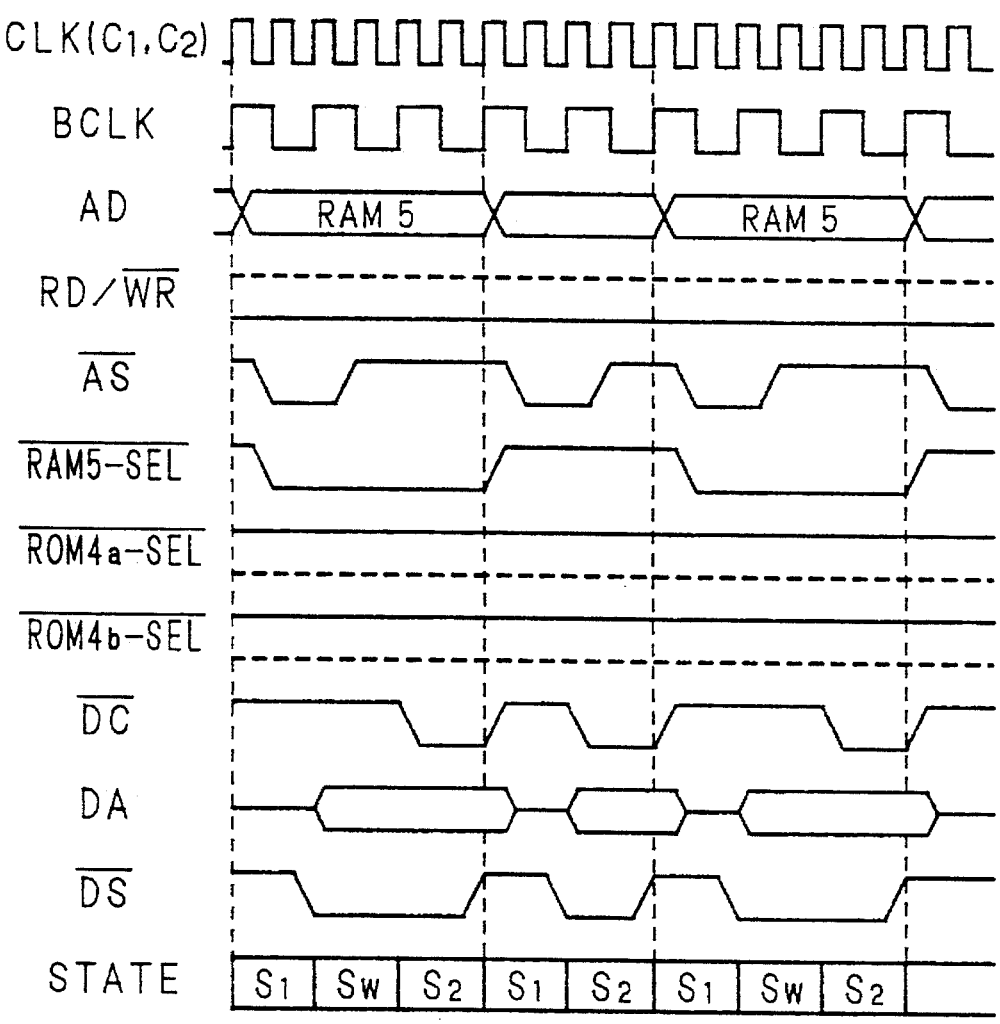
Figure 8:
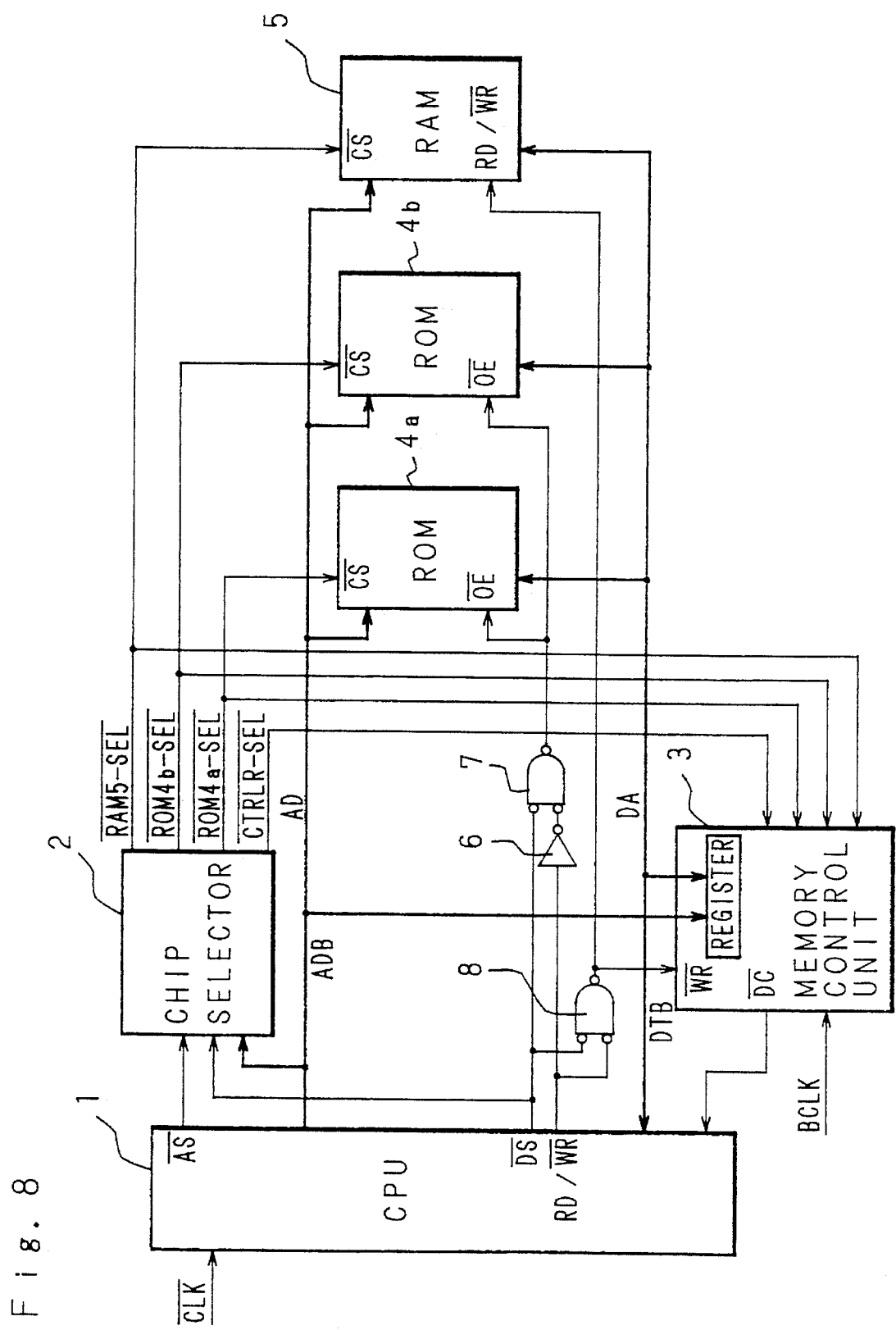
FIG. 8 is a block diagram illustrating a microprocessor development support apparatus using a memory control unit of the invention.

In FIG. 8, reference numeral 1 represents a CPU which operates at the rate of an input clock CLK, the CPU accessing external input/output devices via two ROMs 4a and 4b and RAM 5, which are arranged on a circuit board, and an I/O interface (not shown) by means of an address bus ADB and a data bus DTB. The CPU 1 outputs an address signal AD to the address bus ADB and exchanges data DA via the data bus DTB. The CPU 1 also outputs an address enable signal $\overline{AS}$ indicating that an effective address signal AD is outputted to the address bus ADB and a data enable signal $\overline{DS}$ indicating that the data on the data bus DTB is effective, to the chip selector 2 which selects the ROM 4a, 4b, or RAM 5. The CPU 1 further outputs a read/write signal RD/$\overline{WR}$ which indicates whether the operation is reading or writing of the memory, to one input of an OR gate 8 and, through an inverter 6, to one input of an OR gate 7. Other inputs of OR gates 7 and 8 receive the data enable signal $\overline{DS}$ from the CPU 1. The output of the OR gate 7 is fed to terminals $\overline{OE}$ of the ROM 4a and ROM 4b, and the output of the OR gate 8 is fed to a terminal $\overline{WR}$ of the memory control unit 3 of the invention to be described later and to a terminal $\overline{WR}$ of RAM 5. The chip selector 2 also receives the address signal AD from the address bus ADB, whereby it determines which memory to access (i.e., ROM 4a, 4b or RAM 5). Accordingly selector 2 asserts one of three chip selection signals $\overline{ROM4a\text{-}SEL}$, $\overline{ROM4b\text{-}SEL}$ and $\overline{RAM5\text{-}SEL}$ or control signal CTRLR-SEL of the memory control unit 3. Chip selector 2 outputs the chip selection signals to memory control unit 3 (to be described later) and to selector terminals $\overline{CS}$ of the ROM 4a, 4b and RAM 5. Chip selector 2 alternatively outputs control signal $\overline{CTRLR\text{-}SEL}$ to the memory control unit 3.

Figure 9:
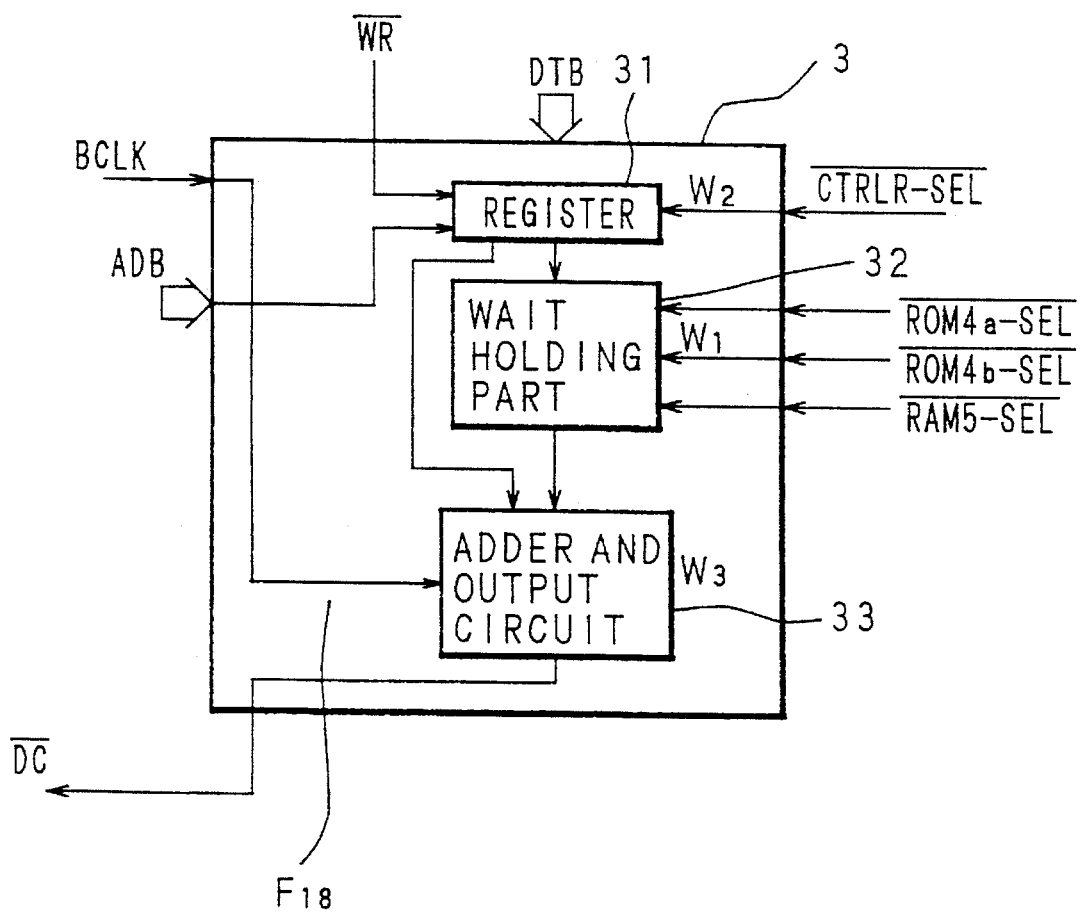
FIG. 9 is a block diagram illustrating a memory control unit of the invention.

FIG. 9 is a block diagram illustrating the memory control unit related to the invention. The memory control unit 3 has a register 31 which holds a variable wait number W2 which sets the bus cycle time, a wait holding section 32 which holds a fixed wait number W1 corresponding to an anticipated access delay time of the memory units 4a, 4b, 5, and an output circuit 33 which sums or adds the variable wait number W2 and the fixed wait number W1 and outputs the result. Bus clock signal BCLK supplied by a clock generator (not shown in the memory control unit 3) is fed to the wait holding section 32 and the output circuit 33. The memory control unit 3 is connected to a CPU 1 via a data bus DTB and an address bus ADB, enabling the rewriting of data under the control of the CPU 1. The memory control unit 3 receives the chip selection signals $\overline{ROM4a\text{-}SEL}$, $\overline{ROM4b\text{-}SEL}$, and $\overline{RAM5\text{-}SEL}$ from the chip selector 2, and selects the fixed wait number W1 held by the wait holding section 32 and adds it to the variable wait number W2 held by the register 31 to determine the wait number W3, and outputs a response signal $\overline{DC}$ corresponding thereto to the CPU 1. To change the variable wait number W2, data from the data bus DTB is read in response to the control signal $\overline{CTRLR\text{-}SEL}$ and the variable wait number W2 held by the register 31 for setting the bus cycle time is rewritten.

Figure 10:
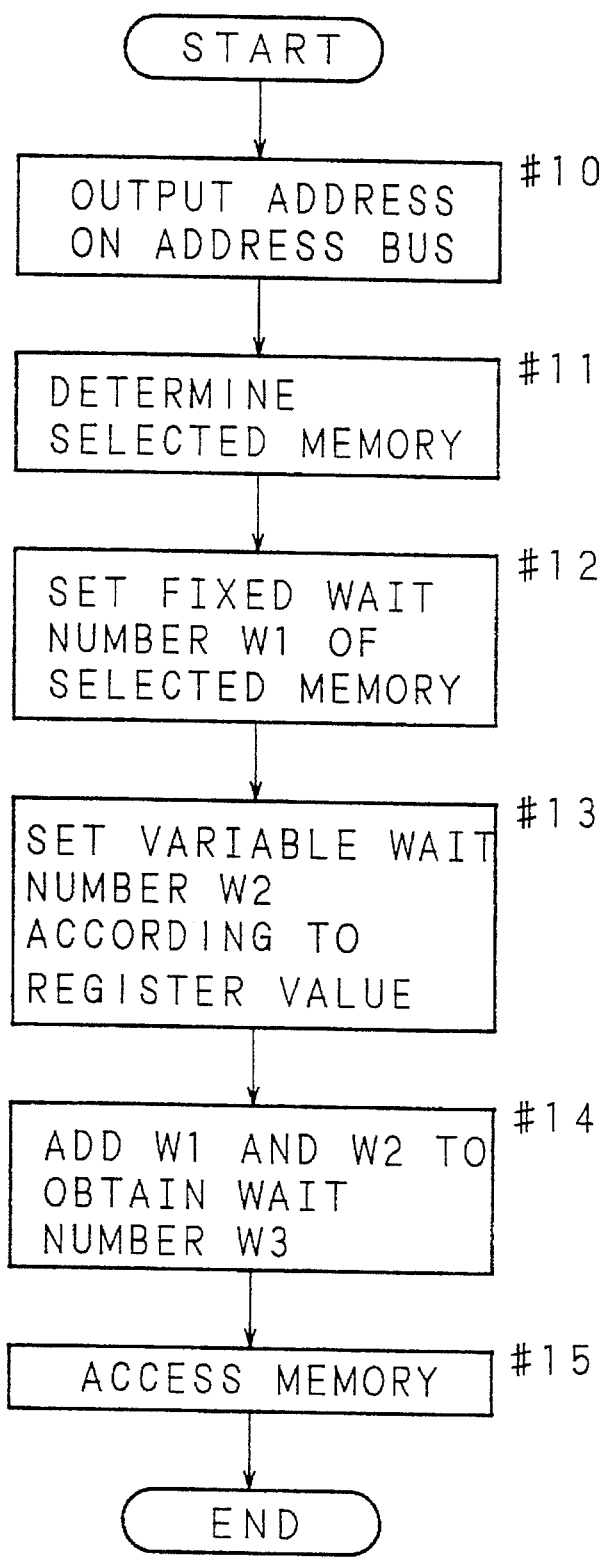
FIG. 10 is a flow chart roughly illustrating the operation of the CPU in accessing memory devices.

Now the operation of the microprocessor system development support apparatus described above and the memory control unit 3 of the invention will be explained with reference to the flow charts shown in FIGS. 10–13 and the timing charts shown in FIGS. 14 and 15. First, assume that the fixed wait number W1 of RAM 5 during reading and writing equals 1, the fixed wait number W1 of the ROM 4a equals 2 and the fixed wait number W1 of the ROM 4b equals 3 as the initial settings. The variable wait number W2 of the register 31 is set equal to 0. FIG. 10 is a flow chart roughly illustrating each memory access operation of the CPU. The CPU 1 outputs an address signal to the address bus ADB (step #10). The chip selector 2 determines which memory unit has been selected by the address signal from the address bus ADB (step #11), and asserts the chip selection signal of the selected memory unit. The memory control unit 3 sets the fixed wait number W1 of the selected memory unit (step #12) and sets the variable wait number W2 in accordance with the contents of the register 31 which determines the bus cycle time (step #13). Then the fixed wait number W1 and the variable wait number W2 are added in the output circuit 33 to determine the wait number W3 (step #14). On the basis of the wait number W3, a response signal $\overline{DC}$ is outputted to the CPU 1 which then accesses the selected memory unit (step #15).

Figure 11:
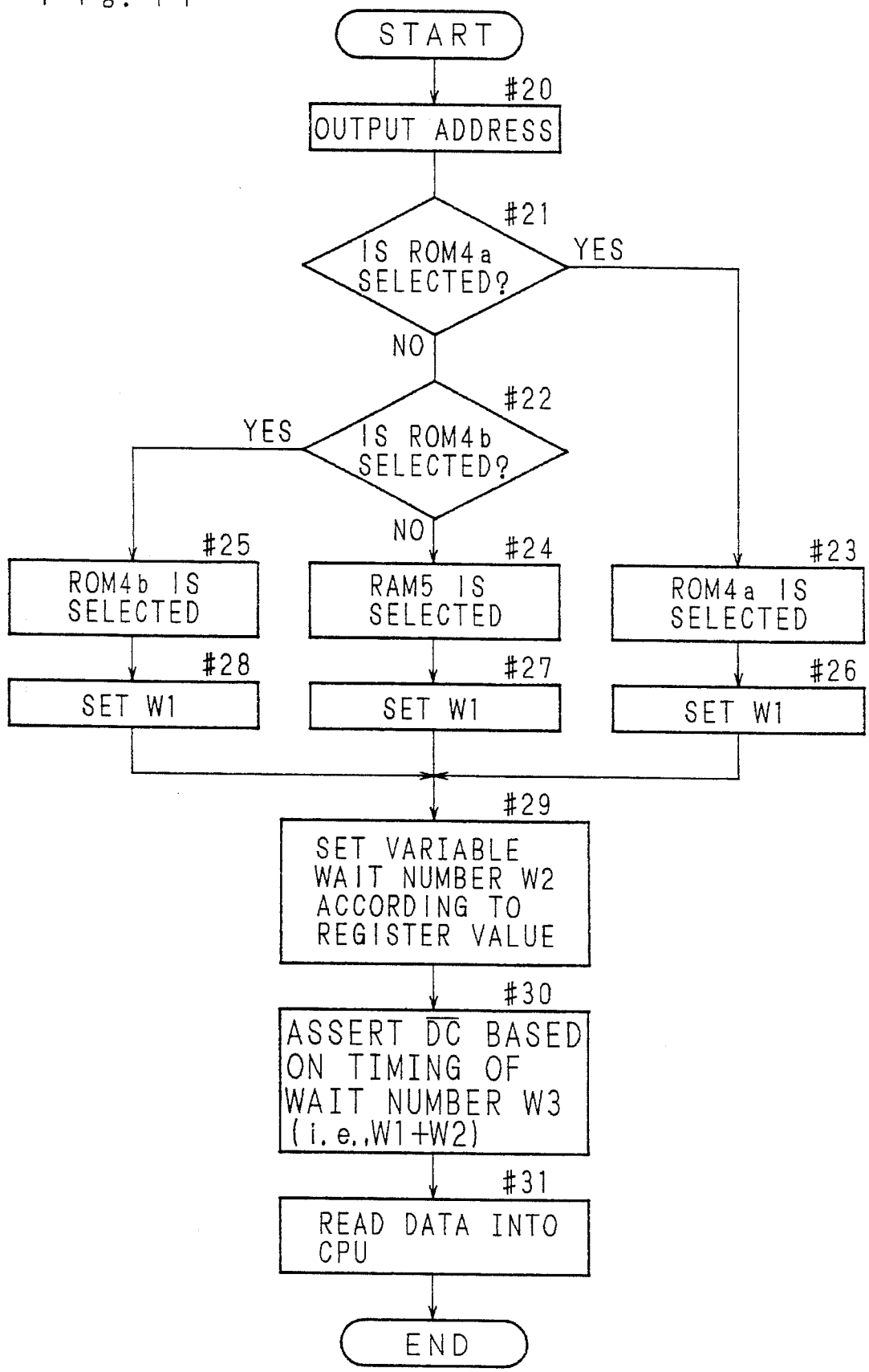
FIG. 11 is a flow chart illustrating the memory reading operation.

FIG. 11 is a flow chart illustrating the reading of data from memory. When the CPU 1 outputs address signal AD to the address bus ADB, the chip selector 2 uses this signal and the address enable signal $\overline{AS}$ to determine which memory unit has been selected (steps #21–#25), and sets the fixed wait number W1 corresponding to the selected memory unit (steps #26–#28). Then the variable wait number W2 is set in accordance with the value of the register 31 (step #29).

The fixed wait number W1 and the variable wait number W2 are added in the output circuit 33. The response signal $\overline{DC}$ is asserted at the timing of the wait number W3 (=W1+W2) and outputted to the CPU 1 (step #30), and the data on the data bus DTB is read into the CPU 1.

Figure 14:
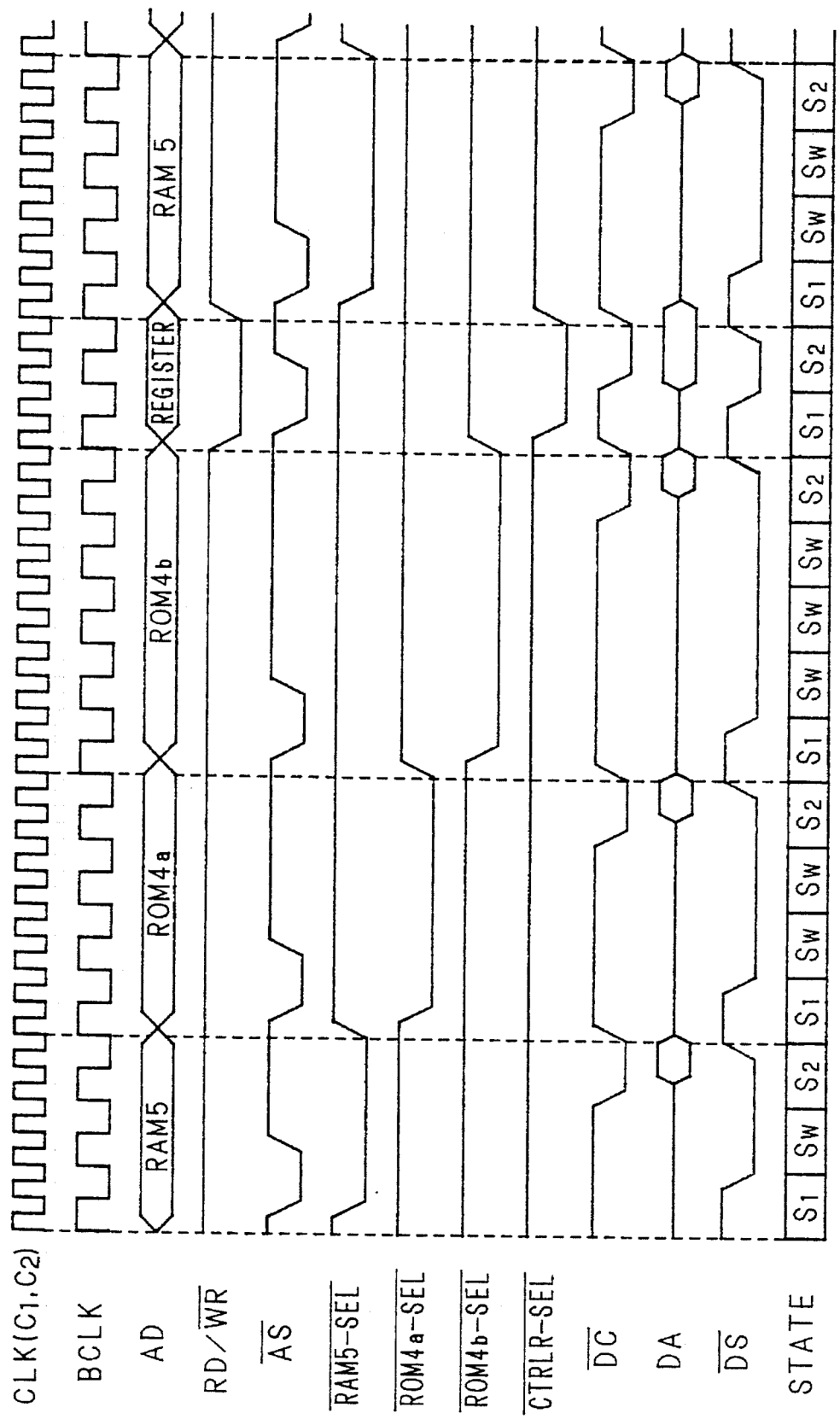
FIG. 14 is a timing chart of memory reading operation.
Figure 15:
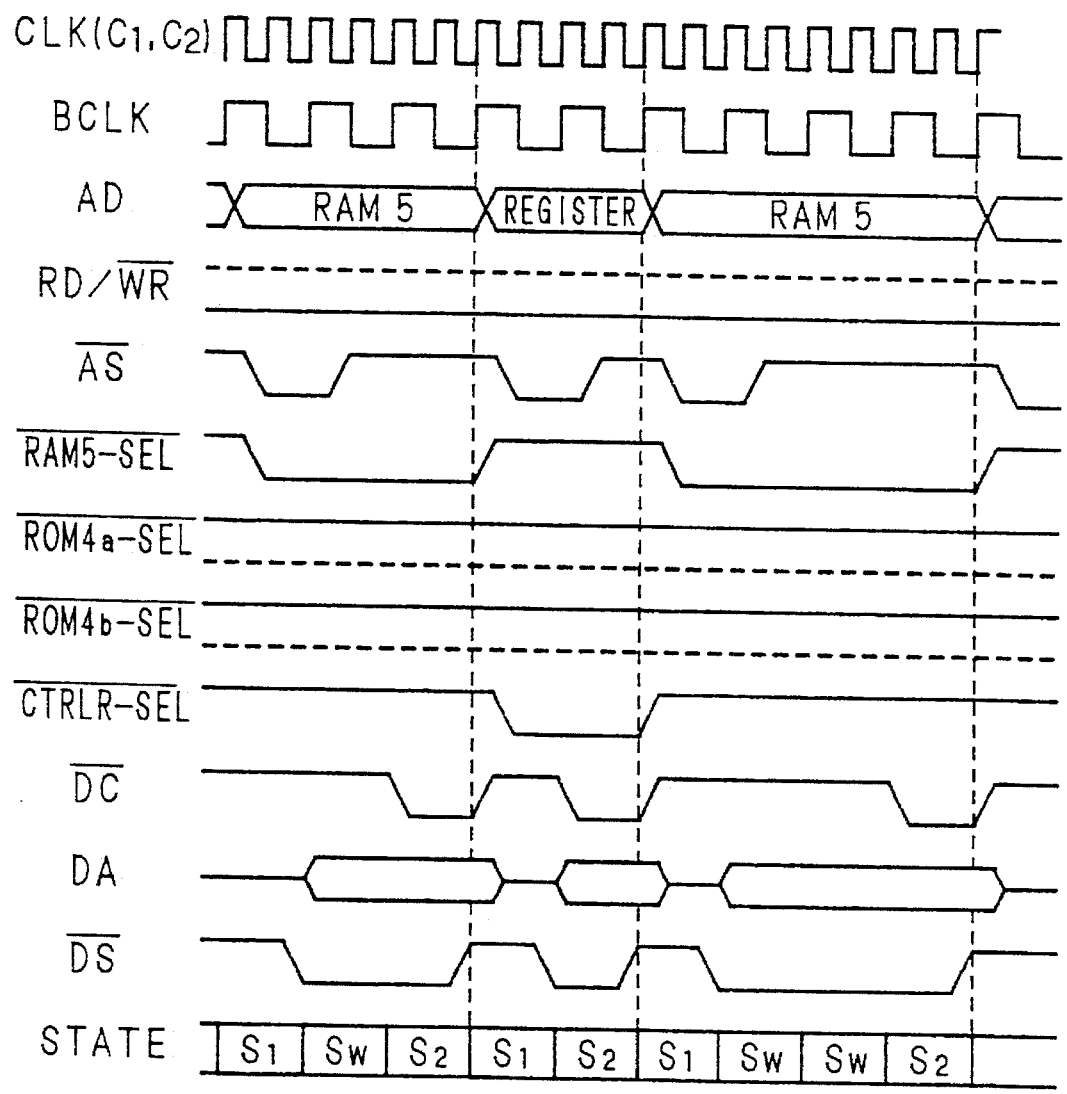
FIG. 15 is a timing chart of memory writing operation.

FIG. 14 is a memory reading timing chart, indicating that the address signal AD on the address bus ADB is outputted at the rise of clock C1 at state S1. At this point, read/write signal RD/$\overline{WR}$ is at "H" level, indicating a read cycle. At the fall of clock C1, the address enable signal $\overline{AS}$ is asserted, indicating that an effective address signal AD is outputted to the address bus ADB. The chip selector 2 determines from the address signal AD that the RAM 5 has been selected (step #21=No, step #22=No), and asserts the chip selection signal $\overline{RAM5\text{-}SEL}$ at the fall of clock C1 at state S1. The memory control unit 3, when the chip selection signal $\overline{RAM5\text{-}SEL}$ is asserted, sets W1=1 by the fixed wait number W1 stored in the wait holding section 32 (step #27). Then the memory control unit 3 sets W2=0 by the fixed variable number W2 stored in the register 31 (step #29), fixes the wait number W3 to WI+W2=1, counts the wait cycle of 1 bus cycle, and inserts wait state Sw. The memory control unit 3 then asserts the response signal $\overline{DC}$ at the rise of clock C1 at state S2 (step #30). When the response signal $\overline{DC}$ is asserted, the RAM 5 decodes the address signal AD and the chip selection signal $\overline{RAM5\text{-}SEL}$, to recognize that it has been selected, and outputs data signal DA to the data bus DTB. When the response signal $\overline{DC}$ is asserted, the CPU 1 takes in the data signal DA at the fall of clock C2 at state S2.

Similarly, wait number W3=2 is set in the case of ROM 4a and wait number W3=3 is set in the case of ROM 4b to read out data.

Now the operation of writing into memory will be explained.

Figure 12:
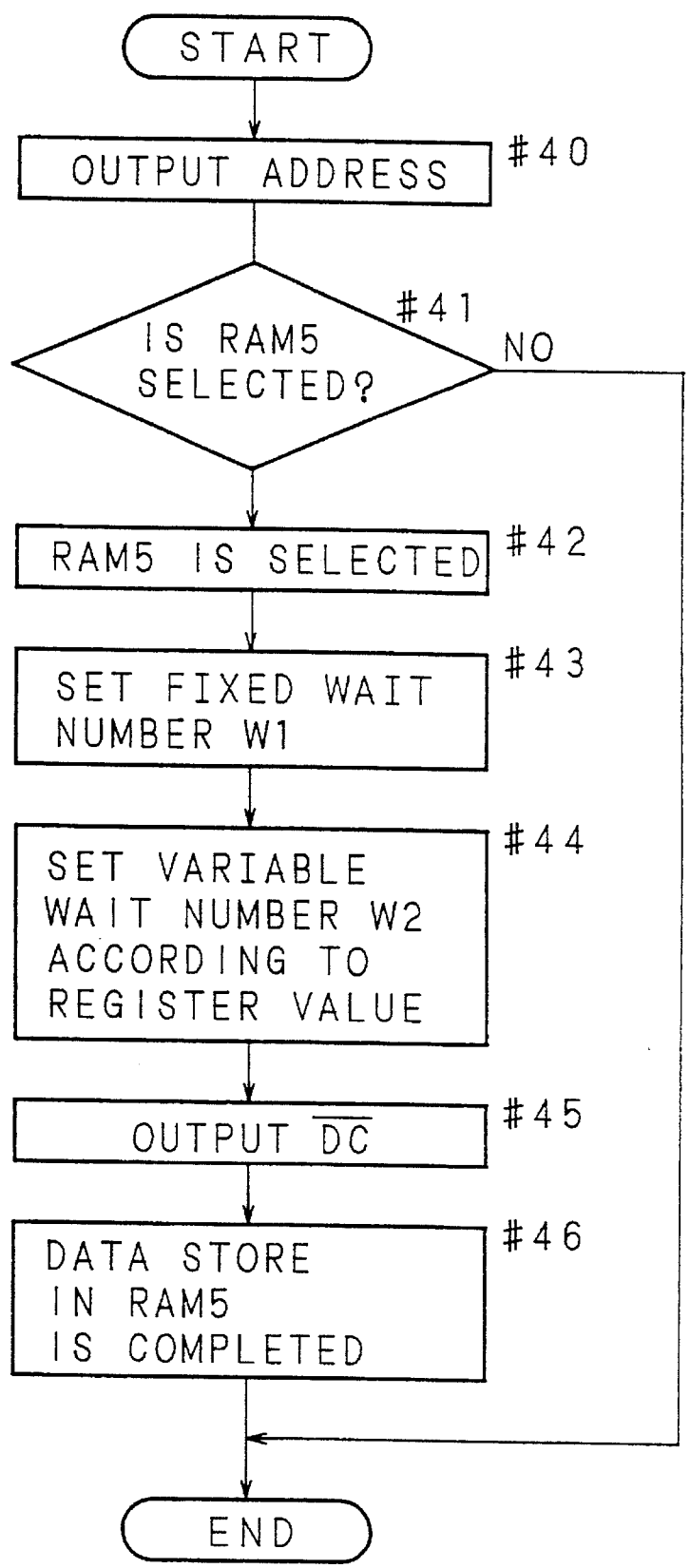
FIG. 12 is a flow chart illustrating the memory writing operation.

FIG. 12 is a flow chart of the writing operation. FIG. 15 is a timing chart of the operation. First, the CPU 1 outputs address signal AD to the address bus ADB at the rise of clock C1 at state S1 (step #40). The read/write signal RD/$\overline{WR}$ at this time is in an "L" state, indicating that it is a write cycle. The address enable signal $\overline{AS}$ is asserted at the fall of clock C1, indicating that an effective address signal AD is present on the address bus ADB and, at the same time, the chip selector 2 determines whether the RAM 5 has been selected by the address signal AD (step #41). If it is determined that the RAM 5 has been selected (step #42), the chip selector 2 asserts the chip selection signal $\overline{RAM5\text{-}SEL}$ at the fall of clock C1 at state S1.

The RAM 5 decodes the chip selection signal $\overline{RAM5\text{-}SEL}$ and the address AD, and determines that RAM5 has been selected. On the other hand, the CPU 1 outputs data to the data bus DTB during state S1. The CPU 1 also asserts the data enable signal $\overline{DS}$ at the fall of clock signal C2 at state S1, indicating that the data on the data bus DTB is settled. Upon assertion of the data enable signal $\overline{DS}$, the RAM 5 takes in the data on the data bus DTB.

The memory control unit 3 sets WI=1 on the basis of the fixed wait number W1 stored in the wait holding section 32 (step #43) when the chip selection signal $\overline{RAM5\text{-}SEL}$ is asserted. Then memory control unit 3 sets W2=0 on the basis of the variable wait number W2 stored in the register 31 (step #44). As the response signal $\overline{DC}$ is asserted at the timing of the wait number W3 (=W1+W2), that is, at the rise of clock C1 at state S2 (step #45), assertion of the response signal $\overline{DC}$ is determined and the data enable signal $\overline{DS}$ is negated at the fall of clock C2 at state S2, and the data storing operation is completed (step #46), completing the write cycle.

Figure 13:
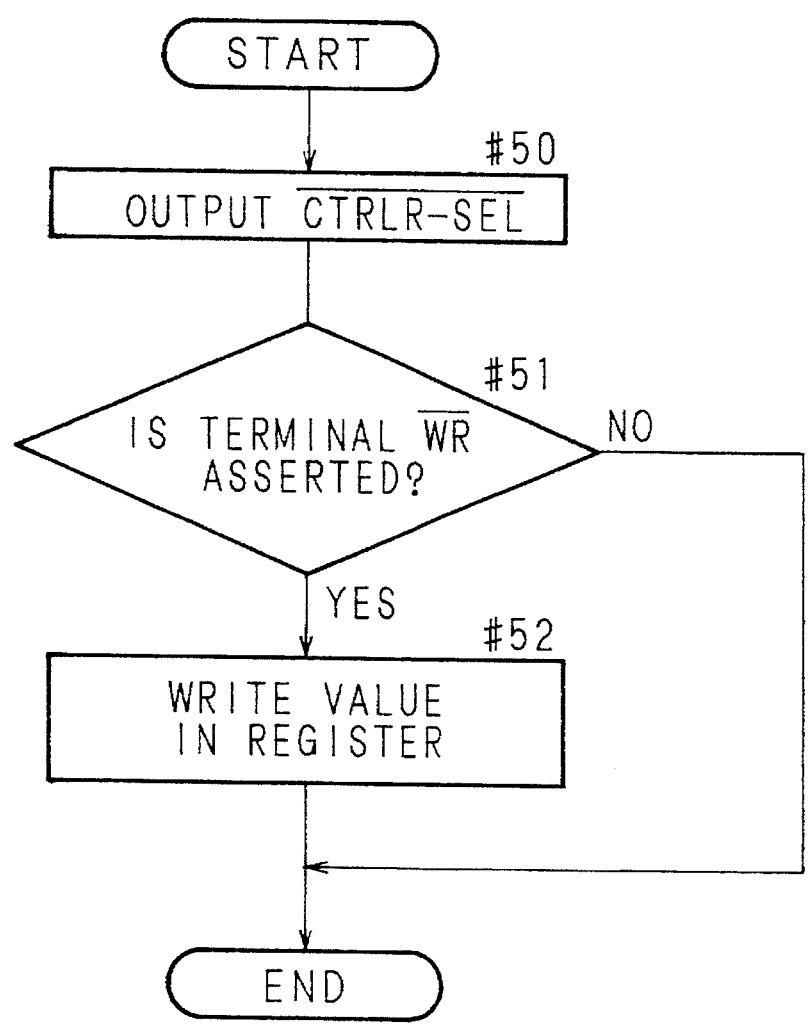
FIG. 13 is a flow chart illustrating the register writing operation.

Now the register rewrite operation which is the main point of the invention will be explained. FIG. 13 is a flow chart explaining the operation of rewriting the registers. The register rewriting operation is similar to the memory rewriting operation. When an address signal specifying the register 31 is outputted to the address bus ADB at the rise of clock C1 at state S1, the chip selector 2 outputs a control signal $\overline{CTRLR\text{-}SEL}$ (step #50). The read/write signal RD/$\overline{WR}$ at this time is in an "L" state, indicating that it is a write cycle. The memory control unit 3 receives the logical OR of the data enable signal $\overline{DS}$ and the read/write signal RD/$\overline{WR}$ at the terminal $\overline{WS}$ and, when the data enable signal $\overline{DS}$ is asserted at the fall of clock C2 at state S1, the signal to be fed at the terminal $\overline{WR}$ is asserted. The memory control unit 3 determines if the signal at terminal $\overline{WR}$ is asserted, i.e., in the state of "L" (step #51) and, if so, the data outputted to the data bus DTB by the CPU 1 is stored in the register 31, and the variable wait number W2 is rewritten to a new value (step #52).

Assume that the contents of the register 31 are rewritten from 0 to 1 in the rewriting operation of the register 31. Should RAM5 be selected for a writing operation, the wait number W3 is changed to 2, which is the wait number W1 required by the RAM 5 added to the variable wait number W2=1 of the register 31. As a result, a response signal $\overline{DC}$ is outputted to the CPU 1 after counting 2 wait states. Also, in a reading operation, similar to the above, new wait number W3 is set as the fixed wait number W1, required by the selected memory device, added to the variable wait number W2=1. The timing of sending the response signal $\overline{DC}$ is delayed in accordance with the wait number.

In accordance with the invention, a variable wait number can be freely changed by the setting of the register 31 in memory control unit 3. As a result, a memory access cycle can be continued when the memory control unit 3 does not return the response signal $\overline{DC}$ to the CPU1. This feature can be utilized, for example, in the stage of manufacturing a microprocessor system development support apparatus by setting a greater value in the register 31, checking to see whether data and address signals are outputted continuously to the respective buses in the desired states, and checking the operation of ROM, RAM, etc.

The function described above can be used with single step operations to facilitate software debugging. Where high-speed operation is required as in real-time operating systems (OS), in particular, high-speed feedback can be achieved by changing the variable wait number W2, thereby reducing the access time in the single-step operation.

When manufacturing a microprocessor system development support apparatus equipped with another CPU using a different operation clock (i.e., a clock operating at a different frequency), circuit emulation is made possible by changing the contents of the register to that for the new microprocessor system development support apparatus.

Although only one register is provided for the bus cycle time setting, and the wait number, which depends on the memory, is fixed in order to keep the register capacity small in this embodiment, the invention is by no means restricted to such an embodiment and it should be regarded as a matter of course that a register may be provided for each memory unit with the data of each register being rewritten by the CPU.

In accordance with the invention, as described above, wait numbers can be freely changed by software, without changing the hardware, by storing a variable wait number in a register and rewriting the data in a write cycle.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A memory control unit which outputs a response signal to a central processing unit (CPU) enabling said CPU to complete a memory access of a memory unit having an anticipated access delay time, the memory unit coupled to said CPU through a data bus and selected by a selecting signal output from a selector in response to a control signal output from a CPU, said memory control unit comprising:

data holding means for holding data that is at least one bit in length and used to define a segment of time, said data holding means including fixed data holding means for holding fixed data representing a fixed delay time based upon the anticipated access delay time of the memory unit, and variable data holding means for holding variable data representing a variable delay time, said variable data holding means having an input that is coupled to said CPU through the data bus;

means for summing said fixed data with said variable data producing a summation of data representing a total delay time and for outputting said response signal to said CPU at a time that is in accordance with said total delay time.

2. A memory control unit as set forth in claim 1 wherein said selector selects the memory unit from one of a plurality of memory units and said fixed data holding means holds fixed data in accordance with the anticipated access delay time of each memory unit.

3. The memory control unit of claim 1 further comprising a control signal input, said control signal input being coupled to said CPU and enabling said variable data holding means to receive said variable data from said CPU through the data bus.

4. The memory control unit of claim 3 wherein said variable data holding means is a register.

5. The memory control unit of claim 4 wherein said selector means selects the memory unit from one of a plurality of memory units and said variable data holding means comprises a plural number of registers, said plural number of registers holding variable data associated with each memory unit.

6. A circuit having a memory unit and a central processing unit CPU for accessing the memory unit, said circuit comprising:

an address bus coupled to said CPU and said memory unit, said address bus for conveying address signals from said CPU to said memory unit;

a data bus coupled to said CPU and said memory, said data bus for conveying data signals between said CPU and said memory unit;

selector means coupled to said address bus for decoding address signals into a select signal, said select signal identifying said memory unit; and a memory control unit coupled to said selector means, said data bus and said CPU for generating a response signal to said CPU that enables said CPU to complete a memory unit access operation, said memory control unit having variable data holding means for holding variable data that represents a variable delay time, said variable data holding means having an input coupled to said CPU through said data bus, and fixed data holding means for holding fixed data that represents an anticipated access delay time of said memory unit, said response signal output at a specific time based upon said variable data representing said variable delay time and said fixed data representing said anticipated access delay time.

7. A circuit as set forth in claim 6 wherein said specific time is based upon a summation of said variable delay time and said anticipated access delay time.

8. The circuit of claim 7 further comprising a control signal line coupling said CPU and said memory control unit, said control signal line enabling transfer of said variable data from said CPU to said variable data holding means through said data bus.

9. The circuit of claim 8 wherein a control signal on said control signal line represents a logical OR of a data enable signal and read/write signal generated by said CPU.

10. The circuit of claim 8 wherein said circuit has plural memory units and said fixed data holding means holds fixed data in accordance with the anticipated access delay time of each memory unit.

11. The circuit of claim 10 wherein said variable data holding means is a register.

12. The circuit of claim 11 wherein said circuit has plural memory units and said variable data holding means comprises a plural number of registers, said plural number of registers holding variable data associated with each memory unit.

13. A method for changing memory access time without changing hardware in an electrical circuit having a memory unit, a central processing unit CPU for accessing the memory unit, address and data buses coupled to the CPU and the memory unit, and a selector coupled to the address bus, said method comprising the steps of:

outputting an address from the CPU to the selector;

selecting a memory control unit based upon the address signal output to the selector, the memory control unit being coupled to the selector and the data bus;

enabling the memory control unit to receive variable data sent from the CPU via the data bus, the variable data representing a variable delay time;

sending the variable data over the data bus from the CPU to the memory control unit;

storing the variable data in the memory control unit; and adding the variable data to fixed data producing a summation of data representing memory access time, the fixed data representing a fixed delay time and stored in the memory unit.

14. The method of claim 13 wherein the step of selecting the memory control unit includes selecting one of several variable data holding means disposed in the memory control unit, each variable data holding means being used to store data received from the CPU over the data bus.

* * * * *